Nov. 8, 1932.  W. E. HOKE  1,887,131
SCREW THREAD GAUGE
Filed April 10, 1930
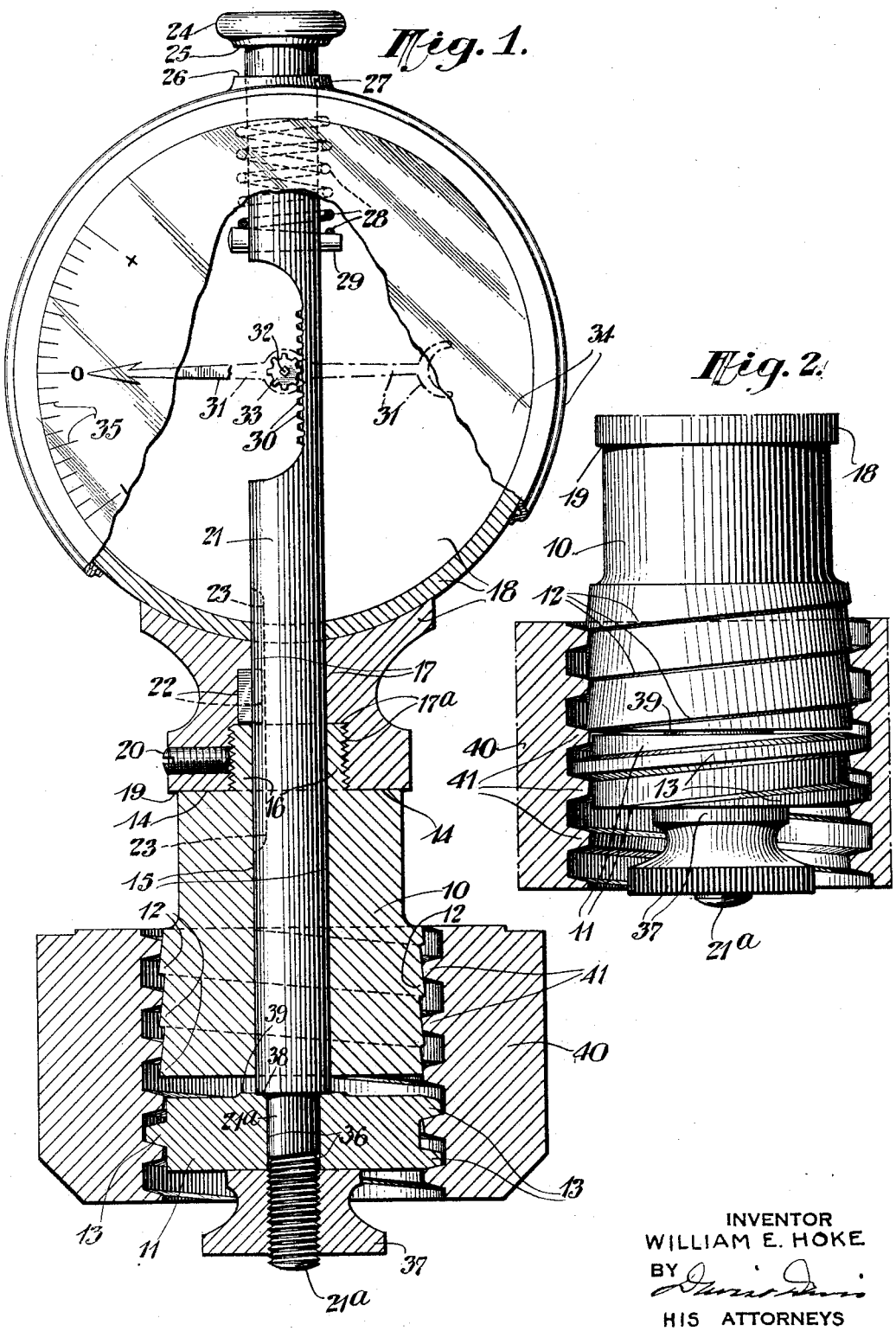
INVENTOR
WILLIAM E. HOKE
BY
HIS ATTORNEYS Patented Nov. 8, 1932

1,887,131

UNITED STATES PATENT OFFICE

WILLIAM E. HOKE, OF BALTIMORE, MARYLAND, ASSIGNOR TO DARDELET THREADLOCK CORPORATION, OF NEW YORK, N. Y., A CORPORATION OF DELAWARE

SCREW THREAD GAUGE

Application filed April 10, 1930. Serial No. 443,064.

This invention relates to improvements in screw thread gauges, and more particularly to gauges for testing internal screw threads.

The principal objects of the invention are to provide a simple and efficient gauge for determining the accuracy of internal screw threads as to minor diameter or the radial displacement from the thread axis of the crest of the thread; to provide a simple and efficient dial-indicator gauge for gauging the minor diameter of screw threads, and particularly for gauging the conoidal crest surface of an internal screw thread of the well known Dardelet type; and to provide a high precision comparator gauge for rapidly determining whether the crest size of internal Dardelet threads falls within a permissible range of plus and minus variation from a standard nominal size.

Other objects and advantages of the invention will appear from the following description of the preferred form of gauge illustrated in the accompanying drawing, wherein Fig. 1 is a view, partly in longitudinal section, showing a Dardelet nut thereon, the crest size of the thread of which is nominal or indicated by the gauge to be exactly true for threads of the standard size the gauge is constructed to test; and Fig. 2 is a fragmentary side elevation of the nut receiving end of the gauge with the parts positioned for easy application or removal of the nut.

The gauge comprises a pair of externally threaded nut-receiving plugs or gauging elements 10 and 11 arranged in axial alignment and supported for limited relative axial displacement while restrained from relative rotary movement. The thread 12 of the relatively fixed element 10 is the crest size comparator or minor diameter determining thread of the gauge, while the thread 13 of the relatively endwisely reciprocable element 11 is the displacement effecting thread of the gauge for bringing the crest surface of the nut or other internal thread to be tested into contact with the gauging face of the comparator thread 12.

Element 11 is movable toward member 10 to adjust the gauge for easy screwing together of the gauge threads and the thread to be tested, or for rapid spinning of a nut upon the gauge when the gauge is used to test nuts as shown. Element 11 is normally spring-urged endwisely away from member 10 in a direction to displace the crest of the nut or other thread to be gauged toward the higher edge of the testing face of thread 12 until it seats on said face. Indicating means are provided operable by the spring displacement of element 11 to indicate the crest size of the tested thread and whether or not said size is within predetermined plus and minus tolerance limits.

In the preferred construction shown, the comparator element 10 comprises a metal plug having the external comparator thread 12 extending to its lower end. Element 10 has an axial cylindrical bore 15 and is reduced in diameter at its upper end to afford a shoulder 14 and a small externally threaded tubular extension 16 screwed into the internally threaded enlarged lower end portion 17ª of the plunger bore 17 of the casing 18 of a dial indicator. Preferably shoulder 14 is screwed up tightly against the adjacent annular face portion 19 of the casing to resist accidental turning of element 10, and a locking set screw 20 may be tapped through the casing and screwed against the threaded extension 16 of element 10 to more securely lock the element to the casing against turning and unscrewing.

The reciprocable plunger 21 of the dial indicator slides in bores 17 and 15 and is held against rotation by a key 22 held in a keyway or recess in the casing and projecting into a longitudinal groove 23 in the plunger. Groove 23 is longer than the key to permit up and down reciprocation of the plunger. The plunger extends through the top of the casing and is provided with a hand-grip knob 24 at its upper end having an annular lower stop face 25 adapted to engage an opposed annular stop face 26 of a boss 27 on the casing in which the upper portion of the plunger is slidably guided. An expansion spring 28 coiled about the plunger is confined between the top of the casing and a transverse pin 29 driven through a hole in the plunger, said spring normally urging the plunger downward until the plunger movement is arrested by engagement of stop faces 25 and 26.

Plunger 21 is formed with rack teeth 30 geared with the usual rotatable hand or, pointer 31 of the dial indicator which is held to a shaft 32 journalled in the casing, upon which shaft is held a pinion 33 meshing with the rack portion 30 of the plunger. The dial casing carries the usual rotatively adjustable and transparent dial 34 which in the present gauge is provided with an arcuate series of graduations 35 one of which is marked "0" and two of which at opposite sides of the "0" graduation are marked respectively "−" and "+", said markings indicating the nominal or standard crest size, and the minus and plus limit crest sizes acceptable for threads of the size the gauge is constructed to test. The construction is such that the graduations may be spaced sufficiently apart for easy reading and still indicate variations in diameter of .0001 inches or smaller for each scale space.

The metallic plug element 11 is preferably made quite short, but of sufficient length to carry on its periphery one full turn of the displacement effecting thread 13, as shown. This element has an axial bore 36 through which extends the reduced cylindrical lower end portion 21ª of plunger 21, the lower part of which end portion is externally threaded to receive the clamping or lock nut 37. Nut 37 tightly clamps element 11 on the plunger against the plunger shoulder 38 at the upper end of portion 21ª to hold element 11 against turning on the plunger with said element so rotatively adjusted on the plunger that thread 13 will guide the nut thread to be tested onto thread 12 with the rib of said nut thread traveling in the deepest part of the groove of thread 12 when the plunger is lifted as far as possible, as shown in Fig. 2.

The lift of the plunger is limited by the abutment of element 11 with element 10 as shown in Fig. 2, element 11 in the construction shown having a boss 39 on its upper end for contacting the lower end of element 10. The lifting of the plunger may be effected by pulling up on knob 24, or by exerting upward pressure on the nut being screwed on or off the gauge as will be apparent from Fig. 2.

The threads 12 and 13 are of equal pitch but of different profile, the pitch corresponding with that of the thread to be tested. The measuring thread 12 is of the buttress thread type having one face of its rib much wider than the other and making a small angle with the axial line of the thread. The diameter of the wider and low angle conoidal face of thread 12 increases in the direction of spring movement or recession of element 11 from member 10, and at its higher side this diameter is at least as great as, and preferably greater than, the crest or minor diameter of the largest acceptable nut or other internal thread. In gauges for testing Dardelet threads the angle of the wider face of thread 12 to the thread axis is the same as that of the locking crest surface of the Dardelet internal or nut thread, namely, six degrees.

The displacement effecting thread 13 is preferably of the same root diameter as thread 12, so that no nut thread may be screwed thereon which will not pass onto thread 12 when the gauge is adjusted as in Fig. 2, and this root diameter of the threads 12 and 13 is made such that it does not exceed (and is preferably slightly less than) the minor diameter of a nut thread having the greatest permissible minus variation from the prescribed nominal minor diameter. The major diameter of thread 13 is preferably substantially greater than that of thread 12, and the rib of thread 13 is formed with steep side faces preferably making the same angle with the thread axis as those of the thread to be tested, as shown. The narrow side face of thread 12 is preferably given a similar angle, as shown. For gauging Dardelet threads this angle is 14½ degrees to a perpendicular to the thread axis, as shown. The profile of thread 13 is preferably such that its rib is much narrower than its groove and the groove of the thread to be tested, and to also afford a cylindrical root surface and a rib of less major diameter than the major diameter of the thread to be tested, as shown. Thread 13 for gauges for Dardelet threads is similar to the well known Acme thread except for the wide variation between the width of its groove and the thickness of its rib.

It will be observed that the threads 12 and 13 are such that a minimum frictional resistance is offered to spinning the nut to be tested upon the gauge as will be apparent from Fig. 2, wherein a Dardelet nut 40 with a Dardelet thread 41 of nominal size is shown being screwed upon the gauge. After the nut is screwed on to the desired extent, the plunger is released and spring 28 will cause the gauge parts and the nominal thread Dardelet nut to assume the position of Fig. 1, with the dial hand pointing to the "0" or nominal size graduation of scale 35. It will be obvious that if the nut thread were under size as to minor diameter it would seat sooner on thread 12 and the hand would stop at the proper point at the minus side of the "0" graduation, while if the thread were oversize, the nut would be displaced farther downward than shown in Fig. 1 and the hand or pointer would move to the proper point at the plus side of the "0" graduation of the scale. To remove the tested nut, it is simply necessary to pull the plunger up and spin off the nut.

What I claim is:

1. A screw thread gauge comprising a member having a helical diameter-gauging surface extending therearound, and spring-urged means for displacing an internally threaded member being tested axially of its thread and of said helical gauging surface to seat the crest of the thread of said member on said gauging surface.

2. A screw thread gauge comprising a member having a helical diameter-gauging surface extending therearound, and spring-urged means for displacing an internally threaded member being tested axially of its thread and of said helical gauging surface to seat the crest of the thread of said member on said gauging surface, and means operated by said spring-urged means for indicating any variation in the minor diameter of the tested thread from a prescribed nominal minor diameter.

3. A gauge for testing internal screw threads as to minor diameter, comprising a plug having an external gauging thread one face of which is much wider than the other and makes a small angle with the plug axis, and means engageable with an internally threaded part to be tested reciprocable longitudinally of said plug and normally spring-urged relatively to the plug in a direction to carry the crest of the internal thread of such part from the lower toward the higher edge of said low angle face of the plug thread.

4. A gauge for testing internal screw threads as to minor diameter, comprising a plug having an external gauging thread one face of which is much wider than the other and makes a small angle with the plug axis, and means engageable with an internally threaded part to be tested reciprocable longitudinaly of said plug and normally spring-urged relatively to the plug in a direction to carry the crest of the internal thread of such part from the lower toward the higher edge of said low angle face of the plug thread, and means operable by said reciprocable means for indicating variations of the minor diameter of the tested thread from a prescribed nominal diameter.

5. In a screw thread gauge, the combination of a dial indicator having a casing and an indicator-operating spring-pressed plunger, a plug held to the casing of said indicator against axial movement and having an external gauging thread, and means operable by said plunger and its spring for axially displacing an internally threaded part whose thread is to be tested, while said part is threaded on said plug, to the limit permitted by the gauging thread of the plug.

6. In a gauge for nut threads, the combination of a dial indicator having a casing and an indicator-operating spring-pressed plunger projecting at one end from its casing, an externally threaded gauging plug held to said casing against longitudinal movement and axially through which said projecting portion of the plunger is reciprocable, and a means on said projecting portion of the plunger and reciprocable therewith for engaging in the thread of a nut screwed on the external gauging thread of the gauging plug to press the nut thread through the medium of the plunger spring against one face of the gauging thread.

7. In a gauge for nut threads, the combination of a dial indicator having a casing and an indicator-actuating plunger normally spring projected from the casing, a plug held to said casing and having an external gauging thread and also an axial bore through which the plunger slidably extends, and means on the plunger at the outer end of said plug for displacing a nut screwed on the plunger toward the outer end of the plug.

8. In a gauge for nut threads, the combination of a dial indicator having a casing and an indicator-actuating plunger normally spring projected from the casing, a plug held to said casing and having an external gauging thread and also an axial bore through which the plunger slidably extends, and a nut-displacing plug held to the outer end of the plunger having an external thread engageable with the thread of a nut to be tested, said plug threads being arranged for screwing of a nut thread to be tested about both plugs at one time.

9. In a gauge for nut threads, the combination of a dial indicator having a casing and an indicator-actuating plunger normally spring projected from the casing, a plug held to said casing and having an external gauging thread and also an axial bore through which the plunger slidably extends, and a nut-displacing plug rigidly held to the outer end of the plunger and having an external thread of the same pitch as the thread of the gauging plug and arranged for free screwing of a nut upon both plugs when the plunger is retracted against the pressure of its spring.

10. A minor diameter gauge for internal screw threads comprising two externally threaded cylindrical members arranged end to end for entering an internal thread to be gauged and connected for relative movement axially alone, said external threads being of the same pitch, and means controlled by such relative axial movement in one direction for indicating the size of the gauged thread with respect to its minor diameter.

11. A gauge for internal screw threads as claimed in claim 10, wherein the thread on one of said members has a minor diameter measuring side face much wider than its other side face and making a small angle with the thread axis.

12. A gauge for internal screw threads as claimed in claim 10, wherein the thread on one of said members has a minor diameter measuring side face much wider than its other side face and making a small angle with the thread axis, and means are provided for spring pressing one member axially relatively to the other in a direction tending to seat the crest of a thread engaged with the member threads on said minor diameter measuring thread face.

In testimony whereof I hereunto affix my signature.

WILLIAM E. HOKE.